United States Patent [19]
MacMaster et al.

[11] 3,831,224
[45] Aug. 27, 1974

[54] TOGGLE LATCH WITH YOKE

[75] Inventors: Edward MacMaster, New Milford; Paul R. Gley, Hillsdale, both of N.J.

[73] Assignee: Rexnord, Inc., Milwaukee, Wis.

[22] Filed: Apr. 2, 1973

[21] Appl. No.: 346,829

[52] U.S. Cl. .............................. 24/68 T, 292/113
[51] Int. Cl. ............................................. E05c 5/04
[58] Field of Search ............... 292/247, 108, 113; 24/68 T, 69 T, 69 CF, 69 CT, 70 CT, 70 ST, 68 CT, 68 CD, 270, 271, 272

[56] References Cited
UNITED STATES PATENTS

| | | | |
|---|---|---|---|
| 966,426 | 8/1910 | Carlson | 292/113 |
| 2,832,446 | 4/1958 | Smith et al. | 24/68 T UX |
| 3,043,616 | 7/1962 | Magnuson | 292/247 X |
| 3,428,348 | 2/1969 | Swanson | 292/113 |
| 3,519,298 | 7/1970 | Gley et al. | 292/113 |
| 3,602,723 | 8/1971 | Swanson | 292/113 |

FOREIGN PATENTS OR APPLICATIONS

| | | | |
|---|---|---|---|
| 552,543 | 4/1943 | Great Britain | 292/113 |

*Primary Examiner*—Donald A. Griffin
*Attorney, Agent, or Firm*—Shenier & O'Connor

[57] ABSTRACT

A versatile toggle latch in which a yoke comprises a crosspiece which threadably receives the shank of a draw hook and a pair of slightly diverging legs the ends of which are pivoted on a handle at a location remote from a location at which the handle is pivoted on a mounting bracket, and in which an element carried by a portion of the draw hook shank between the yoke legs prevents accidental rotation of the draw hook. The handle and crosspiece may be provided with interengageable secondary lock means or with a hasp on the draw hook shank adapted to extend through an opening in the handle.

11 Claims, 11 Drawing Figures

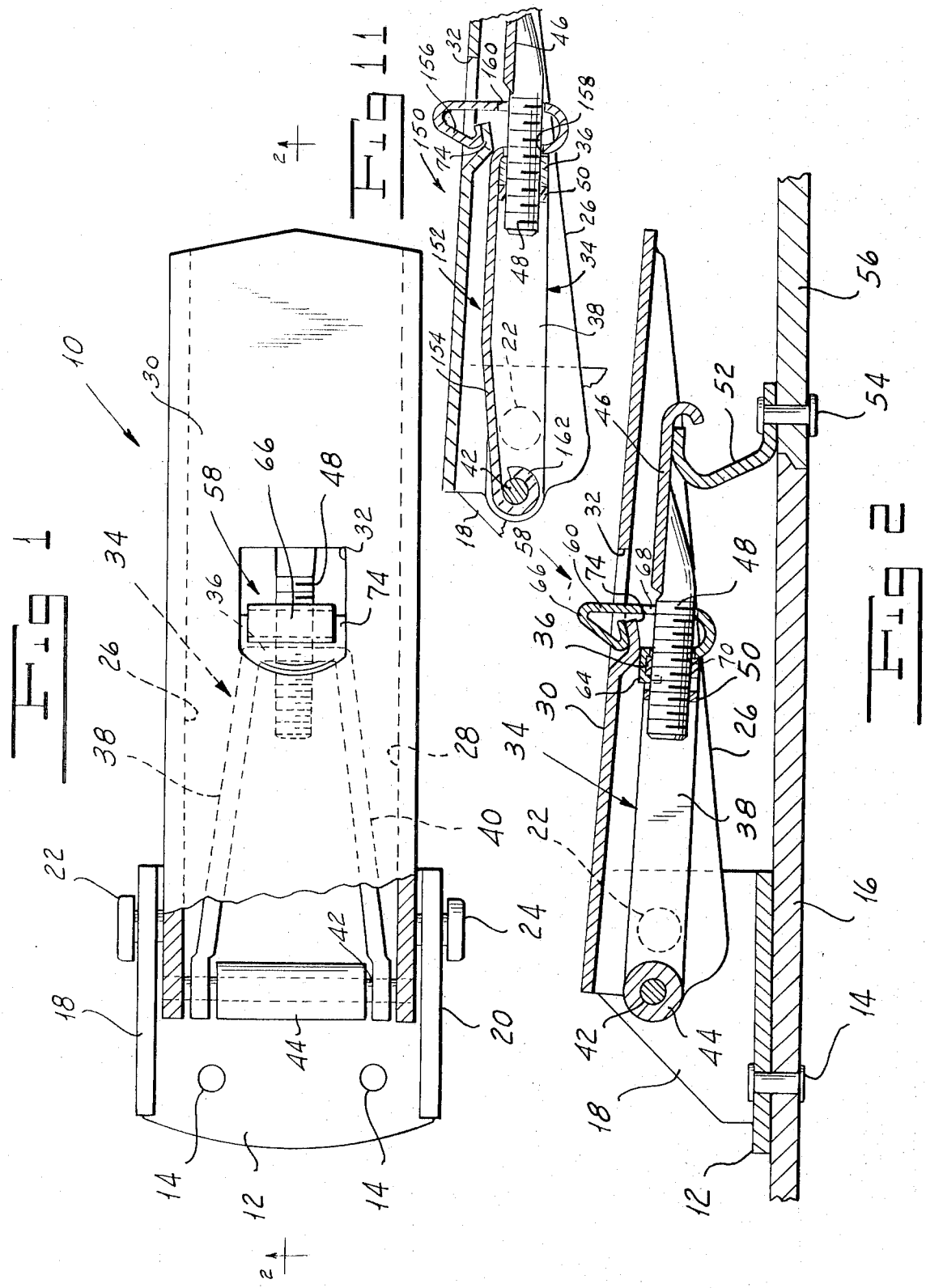

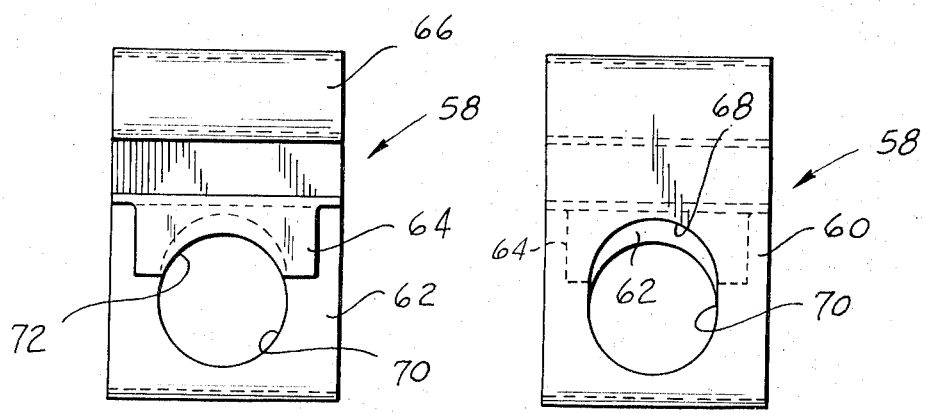
Fig 3
Fig 4
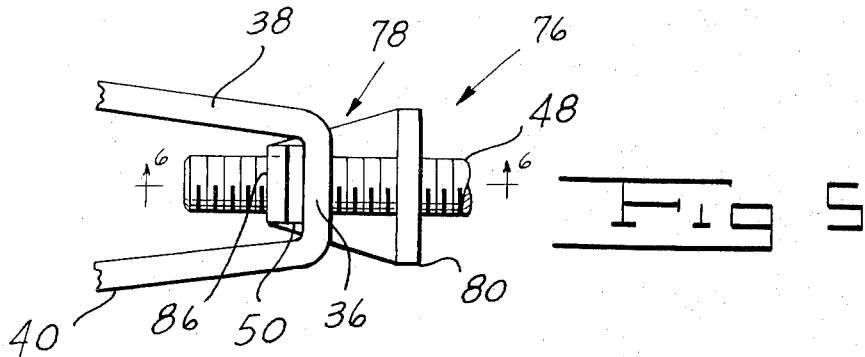
Fig 5
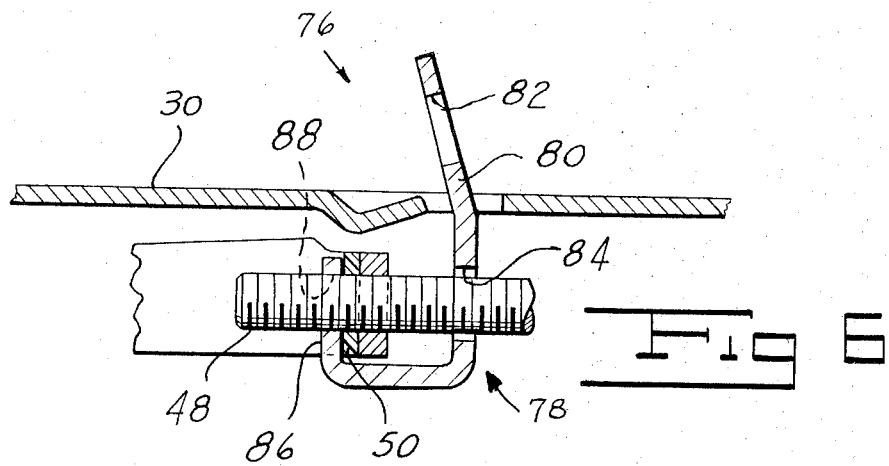
Fig 6

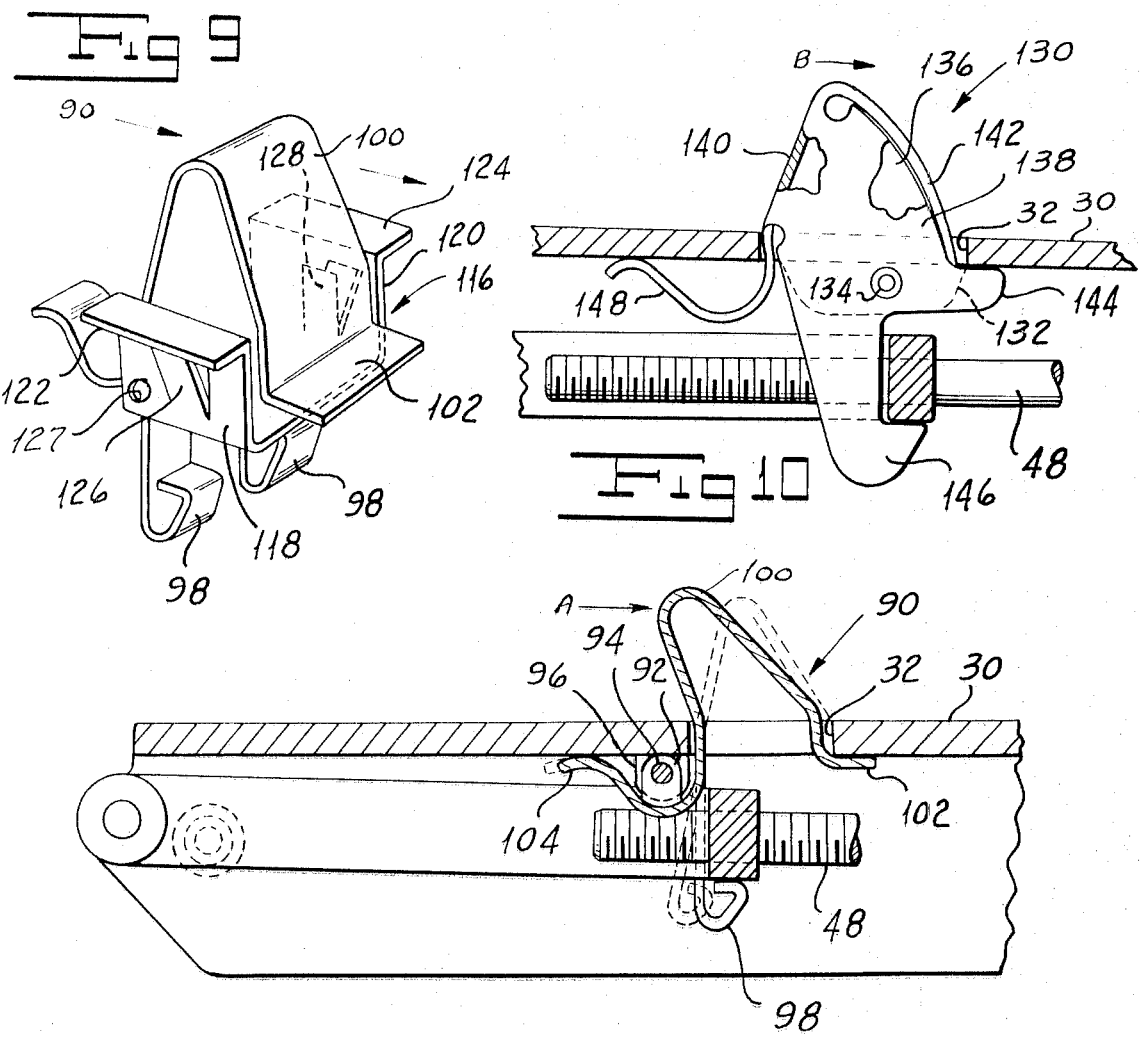

TOGGLE LATCH WITH YOKE

BACKGROUND OF THE INVENTION

There are known in the prior art latches of the toggle type in which a handle pivotally supported on a bracket carried by one of the members to be joined supports a pivot pin at a location spaced from the bracket mounting, which pivot pin receives a draw hook assembly, the hook of which is adapted to engage a strike on the other of the two members to be joined when the handle is moved to its closed position. In most of the latches of the prior art the draw hook itself includes a threaded shank and a sheet metal member bent to provide a bearing sleeve for receiving the pivot pin and so formed so as to provide a socket into which the draw hook shank is screwed.

Many of the latches of the type described above are provided with a secondary lock for releasably locking and latching the handle in its closed position. Typical examples of latches of this type are shown in Gley et al. U.S. Pat. No. 3,519,298 and in Swanson U.S. Pat. No. 3,602,723. These two patents illustrate various forms of secondary locks in which interengageable elements on the draw hook assembly and on the handle are engaged to lock the latch in its closed position. Owing to the construction of the draw hook receiving and pivoting member described hereinabove, the secondary lock constructions of the prior art are relatively complicated and consequently are expensive to manufacture. It further is desirable in some instances that latches of the type described above be provided with a hasp adapted to extend through an opening in the handle in order to receive a padlock. Draw hook assemblies of the prior art which themselves are relatively complicated do not readily lend themselves to a construction including such a hasp.

We have provided a toggle latch with a yoke which overcomes the defects of toggle latches of the prior art pointed out hereinabove. Our toggle latch is relatively simple to construct. It is inexpensive to manufacture. It readily lends itself to the provision of either a secondary lock assembly or to a hasp. The construction of the basic latch assembly need not be modified whether a secondary lock or a hasp is provided.

SUMMARY OF THE INVENTION

One object of our invention is to provide a toggle latch with a yoke which overcomes the defects of toggle latches of the prior art.

Another object of our invention is to provide a toggle latch with a yoke which may alternatively be provided with a secondary lock or with a hasp.

A further object of our invention is to provide a toggle latch the basic construction of which need not be changed whether a secondary lock or a hasp is to be provided.

A further object of our invention is to provide a toggle latch with a simplified draw hook mounting assembly.

Still another object of our invention is to provide a toggle latch with a yoke which is relatively inexpensive to construct.

A still further object of our invention is to provide a toggle latch with a yoke which readily lends itself either to a construction in which a secondary latch is mounted on the draw hook assembly or on the handle.

Other and further objects of our invention will appear from the following description.

In general our invention contemplates the provision of a versatile toggle latch in which a yoke is made up of a crosspiece which threadably receives the shank of a draw hook and of a pair of slightly diverging legs the ends of which are pivoted to the latch handle at a location remote from a location at which the handle is pivoted on a mounting bracket and in which a friction nut or similar element carried by the portion of the draw hook shank between the yoke legs prevents accidental rotation of the draw hook in response to vibration or the like. An opening in the handle above the yoke crosspiece permits a secondary lock to be mounted either in the handle opening or on the crosspiece for engagement with either the crosspiece or with the edge of the handle opening or permits the mounting of a hasp on the draw hook assembly so as to extend outwardly through the handle opening in the closed position thereof.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a top plan view of one form of our toggle latch with a yoke.

FIG. 2 is a sectional view of the latch illustrated in FIG. 1 taken along the line 2—2 thereof and drawn on an enlarged scale.

FIG. 3 is a rear elevation of the secondary catch employed in the form of our invention illustrated in FIGS. 1 and 2.

FIG. 4 is a front elevation of the catch shown in FIG. 3.

FIG. 5 is a fragmentary top plan view of an alternate form of our toggle latch with a yoke with some parts removed.

FIG. 6 is a sectional view of the form of our toggle latch with a yoke illustrated in FIG. 5 and taken along the line 6—6 thereof.

FIG. 7 is a fragmentary sectional view of yet another form of our toggle latch with a yoke.

FIG. 8 is a sectional view of a still further form of our toggle latch with a yoke.

FIG. 9 is a perspective view of an alternate form of auxiliary catch mounting means for use with our toggle latch with a yoke.

FIG. 10 is a sectional view of yet another form of our toggle latch with a yoke with parts broken away and with other parts shown in section.

FIG. 11 is a fragmentary view of still another form of our toggle latch with a yoke with parts broken and with other parts shown in section.

DESCRIPTION OF THE PREFERRED EMBODIMENT

Referring now to FIGS. 1 and 2 of the drawings, one embodiment, indicated generally by the reference character 10, of our toggle latch with a yoke includes a bracket 12 adapted to be secured by rivets 14 or the like to one of the members 16 to be joined. Bracket 12 includes sides 18 and 20 carrying respective pins 22 and 24 which pass through the sides 26 and 28 of the handle 30 so as pivotally to support the handle for movement on the bracket 12 around an axis passing through the pins 22 and 24. Preferably we provide the handle 30 with an opening 32 for a reason to be described hereinbelow.

The assembly 10 includes a yoke, indicated generally by the reference character 34, made up of a crosspiece 36 and respective legs 38 and 40 which are slightly divergent. The ends of the legs 38 and 40 remote from the crosspiece 36 receive a pivot pin 42 carried by the sides 26 and 28 of the handle 30. We provide a spacer sleeve 44 on the pin 42 between the ends of the legs 38 and 40.

The draw hook 46 of the assembly 10 is provided with a threaded shank 48 adapted to be threaded through the crosspiece 36 of the yoke 34. We thread the end of the shank 48 remote from the draw hook 46 through a suitable element such as a nylon torque nut 50. As is known in the art, in the course of this operation the shank 48 cuts its own threads in the nut 50. As a result there is a relatively great frictional resistance to relative rotation between the nut and the shank 48. The nut 50 is so positioned between the legs 38 and 40 of the yoke 34 and is so dimensioned that any tendency of the draw hook to rotate in response to vibration or the like after the assembly is complete is resisted by virtue of the engagement of the nut 50 with the legs 38 and 40. As can be seen from the structure thus far described, when the handle 30 is moved to its open position from the position shown in the drawings, the axis of pivot pin 42 moves through the space between the pivotal axis formed by pins 22 and 24 and the base of the bracket 12. When that occurs, the draw hook assembly moves generally to the right as viewed in FIGS. 1 and 2. Conversely, when the handle is moved to its closed position, the draw hook moves generally to the left as viewed in FIGS. 1 and 2.

Our latch is adapted for use with a strike 52 secured to the other of the two members 56 to be joined by any suitable means such for example as by rivets 54. When the handle moves from its open to its closed position with the members 16 and 56 juxtaposed, the draw hook 46 engages the strike 52 to draw the parts tightly together.

Referring now to FIGS. 1 to 4, the assembly 10 includes a secondary lock indicated generally by the reference character 58. Lock 58 includes a pair of legs 60 and 62 the leg 62 of which is provided with a return bend 64. We form a catch 66 on the end of the leg 60 remote from leg 62. As the draw hook 46 is assembled with the yoke 34 the lock 58 first is assembled on crosspiece 36 with its leg 62 engaging the outer surface of the crosspiece and with the return bend 64 engaging the inner surface. Next, the shank 48 passes first through a relatively large opening 68 in leg 60 and then through a smaller opening 70 in leg 62 following which it is threaded through the opening in the crosspiece 36. We provide the return bend 64 with a recess 72 for accommodating a shank 48. Finally, the shank is threaded into the torque nut 50. When the handle is moved from its open position to its closed position in the manner described above, catch portion 66 rides over an edge of the opening 32 and into operative engagement with the strike 74 formed at that edge of the opening 32. It will be appreciated that the relatively larger opening 68 accommodates the necessary pivotal movement of the leg 60 relative to the shank 48.

Referring now to FIGS. 5 and 6, we have illustrated an alternate embodiment of our toggle latch with a yoke indicated generally by the reference character 76. The principal parts of this form of our toggle latch are substantially identical with those of the form of our toggle latch illustrated in FIGS. 1 and 2. The assembly 76 differs in that we provide it with a hasp, indicated generally by the reference character 78, rather than with the secondary lock 58. Hasp 78 includes a relatively longer leg 80 adapted to extend upwardly through the handle opening 32 when the handle is closed. The upper portion of this leg is provided with an opening 82 adapted to receive a padlock or other device for holding the latch closed. We form the lower portion of leg 80 with a relatively large opening 84 through which the shank 48 is adapted to pass. Hasp 76 includes a second relatively shorter leg 86 formed with a threaded opening 88 through which the shank 48 is threaded to hold the hasp 76 in position on the assembly.

The assembly 76 further differs from the assembly 10 in the manner in which the torque nut 50 is applied to the structure. In the form of our assembly illustrated in FIGS. 1 and 2, the torque nut is assembled on the shank 48 with its longer dimension generally horizontally disposed. Conversely, in the form of our assembly illustrated in FIGS. 5 and 6, the torque nut is assembled on the shank 48 with its longer dimension generally vertical. Further, while the torque nut is relatively remote from the crosspiece 36 in the form of our invention shown in FIGS. 1 and 2, it is immediately adjacent thereto in the form of our invention illustrated in FIGS. 5 and 6. Other than in these details the friction nut 50 functions in the same manner to prevent accidental rotation of the draw hook as in response to vibration of the installation and the like.

Referring now to FIG. 7, we have illustrated a still further form of our toggle latch incorporating an alternate form of secondary lock, indicated generally by the reference character 90. In this form of our assembly, we provide a pair of spaced brackets 92 on the underside of the handle 30 adjacent to the edge of the opening 32. Brackets 92 support a pivot pin 94 which receives a pair of ears 96 on the lock 90. The lock 90 includes a pair of downwardly extending catch elements 98 which, in the closed position of the handle, are adapted to ride over the crosspiece 36 on each side of the shank 48 and to snap into engagement with the underside of the crosspiece 36. The lock 90 includes an operating portion 100 which extends outwardly above the surface of the handle 30. A retainer 102 formed on the operating portion engages the underside of the handle 30 at a location remote from the brackets 92. A spring portion 104 of the lock 90 engages the underside of the handle 30 to bias the catch to the position shown in the drawings. When the catch is to be released the operating portion 100 is pulled in the direction of the arrow A in FIG. 7. When that occurs, the catch portions 98 pivot generally around the axis of pin 92 and against the action of the biasing spring 104 to locations at which they are clear of the crosspiece 36 so that the handle can be moved to its open position.

Referring now to FIG. 8, we have illustrated an alternate mounting means for the secondary lock 90. This mounting means, indicated generally by the reference character 106, comprises an elongated plate 108 provided at one end with a pair of spaced ears 110 adapted to be received by the handle mounting pins 22 and 24.

The end of the plate 108 remote from the ears 110 is formed with a return bend 114 adapted to be snapped over one edge of the opening 32 so that plate 108 pivots with handle 30. A pair of lugs 112 at that end of the plate 108 carry the pivot pin 94 which supports the auxiliary lock 90 in the same manner as described in connection with the showing of FIG. 7.

Referring now to FIG. 9, yet another form of mounting means indicated generally by the reference character 116 for the secondary lock 90 is a snap-in bracket including a pair of sides 118 and 120 formed with flanges 122 and 124 and with respective struck-out lugs 126 and 128. Each side 118 and 120 has an opening 127 to receive the pivot pin 94 for the lock 90. This assembly can readily be snapped into the opening 32, with the flanges 122 and 124 overlying the side edges of the opening and with the lugs 126 and 128 snapping into engagement with the underside of the handle 30 so as to hold the assembly in position.

Referring now to FIG. 10, another form of secondary lock which we may employ with our toggle latch having a yoke, is indicated generally by the reference character 130. In this installation, we form respective brackets 132 on the underside of the handle 30 and along the side edges of the opening 32 to receive a pivot pin 134. This form of our lock which may be stamped from sheet metal and then bent to shape includes sides 136 and 138, a back 140, and a front 142. We provide each of the sides 136 and 138 with a retainer 144 adapted to engage the underside of the handle 30. Downward extensions of each of the sides 136 and 138 are formed with catch elements 146 adapted to engage the underside of the crosspiece 36 in the locked-up position of the assembly. A leaf spring extension 148 formed on the back 140 biases the catch 132 to the position shown in FIG. 10. To release this lock pressure is exerted against the back 140 in the direction of the arrow B to move the lock against the action of spring 148 to a position at which the catch elements 146 are free of the crosspiece 36.

Referring now to FIG. 11, a still further form of secondary lock, indicated generally by the reference character 152 may be used with our toggle latch with a yoke, in an assembly indicated generally by the reference character 150. The toggle latch parts of the assembly 150 are the same as those of the forms of the invention described hereinabove. The secondary lock 152 may be formed as an integral member from sheet metal or the like with an arm one end of which is formed with a U-shaped bend one leg of which is formed with a catch 156 and the legs of which are provided with respective openings 158 and 160 through which the shank 48 passes. The other end of the arm 154 is formed with a bearing portion 162 which is carried by pin 42.

The assembly of the draw hook 46 with the yoke 34 is substantially the same in the forms of our invention illustrated in FIGS. 1 to 6 and 11. As the draw hook shank 48 is threaded through the crosspiece 36 it is threaded through the torque nut 50. As it moves through the torque nut is cuts its own threads. As a result there is provided a relatively high frictional force against relative rotation between the nut and the shank 48. Any tendency of the draw hook to rotate brings the nut into engagement with the arms 38 and 40 of the yoke to prevent further rotation. Thus, the assembly is protected against harmful effects of vibration in the installation in which it is used. In the forms of our invention illustrated in FIGS. 7 to 10 we may use an alternative means to prevent accidental rotation such as a nylon coating on the threads of shank 48.

Where the draw hook assembly is to be provided with a secondary lock such as the lock 58 of FIGS. 1 and 2, as the shank is brought into operative relationship with the crosspiece 36, it first passes through the openings 68 and 70 of the legs 60 and 62. After it has been threaded through the crosspiece 36 it is then threaded through the torque nut 50 in the manner described above. In the form of our assembly illustrated in FIGS. 5 and 6, the shank 48 is first threaded through the crosspiece 36 and then through the torque nut 50 before being threaded through the leg 86 of the hasp 76. It is to be noted further that owing to dimensional considerations, the long dimension of the torque nut is generally horizontal in the form of our invention illustrated in FIGS. 1 and 2 and is generally vertical in the form of the invention illustrated in FIGS. 5 and 6.

In the form of our invention illustrated in FIGS. 7 to 10 we may provide shank 48 with a coating of nylon to inhibit rotation of the draw hook relative to the crosspiece 36 into which shank 48 is threaded. In these forms of our invention, the catch element 90 or 130 is assembled on the handle in the manner described hereinabove.

In operation of the form of our invention illustrated in FIGS. 1, 2 and 11, as the handle 30 is moved from open position to closed position, the draw hook 46 engages the strike 52 and, as the handle moves to its fully closed position, the catch 66 or 156 snaps over the strike 74 to lock the parts in the closed position. To release the handle, the catch 66 or 156 is moved out of engagement with strike 74 against the inherent resilience of the material of which the lock 58 or 152 is formed. It will readily be appreciated that the relatively larger opening 68 or 160 permits this movement.

Where our latch is provided with a hasp as shown in FIGS. 5 and 6, the handle is moved to the closed position as before to bring the draw hook into engagement with the strike. When the handle is in its fully closed position, the longer leg 80 of the hasp 76 extends upwardly through the opening to permit a padlock or the like to be applied to the hasp through the opening 82.

In the form of our invention illustrated in FIGS. 7 to 9 where the secondary lock is carried by the handle 30, as the handle is moved to its fully closed position the latching elements 98 snap into position under the crosspiece 36 to hold the parts locked. To release the secondary lock, the operating part 100 is moved in the direction of the arrow A to cause the latching element 98 to move out from under the crosspiece 36 to free the handle. This takes place against the action of the spring 104. The secondary lock 130 operates in substantially the same way in response to a force in the direction of the arrow B in FIG. 10.

It will be seen that we have accomplished the objects of our invention. We have provided a toggle latch with a yoke which overcomes certain defects of toggle latches of the prior art. Our toggle latch may readily and alternatively be provided with either a secondary lock or with a hasp without modification of any of the basic parts of the latch. The secondary lock may be mounted on the draw hook assembly for engagement with the handle or alternatively it may be mounted on the handle for engagement with the crosspiece of the draw hook assembly. Our assembly is relatively simple in construction. It is inexpensive to manufacture. Our assembly is resistant to vibration.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A toggle latch including in combination, a hendle, means mounting said handle for pivotal movement around a first axis between an open and a closed position, a yoke comprising a pair of spaced legs and a crosspiece connecting said legs adjacent first ends thereof, means mounting said legs on said handle adjacent second ends of said legs for pivotal movement of said yoke around a second axis spaced from the first axis, a draw hook provided with a threaded shank, said crosspiece provided with a threaded opening for receiving said shank with a portion thereof disposed between said legs and a torque nut carried by the portion of said shank between said legs for inhibiting relative rotary motion between said nut and said shank portion, the distance between said legs in the region of said torque nut and the dimensions of said nut being such as to limit rotary movement of the assembly of said nut and said shank portion relative to said yoke.

2. A toggle latch as in claim 1 in which said handle is formed with an opening located adjacent said crosspiece in the closed position of the handle, a resilient catch, and means mounting said catch on one of the portion of the handle adjacent said opening and said crosspiece for engagement with the other of said crosspiece and handle portion with said handle with closed position.

3. A toggle latch as in claim 1 in which said handle is formed with an opening located adjacent to said crosspiece in the closed position of the handle, a hasp, and means mounting said hasp on said shank adjacent said crosspiece whereby said hasp extends through said opening in the closed position of said handle.

4. A toggle latch including in combination, a handle formed with an opening, means mounting said handle for pivotal movement around a first axis between an open position and a closed position, a yoke comprising a pair of spaced legs and a crosspiece connecting said legs adjacent the first ends thereof, means mounting said legs on said handle adjacent to second ends of said legs for pivotal movement of said yoke around a second axis spaced from said first axis, and with said crosspiece adjacent to said opening in the closed position of said handle, a draw hook having a shank, means mounting said draw hook shank on said corsspiece and a hasp carried by said shank adjacent to said crosspiece, said hasp including a leg extending through said opening in the closed position of said handle.

5. A toggle latch including in combination, a handle formed with an opening, means mounting said handle for pivotal movement around a first axis between an open position and a closed position, a yoke comprising a pair of spaced legs and a crosspiece connecting said legs adjacent to first ends thereof, means mounting said legs on said handle adjacent to second ends of said legs for pivotal movement of said yoke around a second axis spaced from first axis, and with said crosspiece adjacent to said opening in the closed position of said handle, a draw hook having a shank, means mounting said draw hook shank on said crosspiece, a secondary lock, means mounting said lock on said crosspiece for movement into and out of engagement with a portion of said handle at the edge of said opening, and means for biasing said lock into engagement with said portion.

6. A toggle latch as in claim 5 in which said lock and said biasing means comprise an integral member of resilient material.

7. A toggle latch as in claim 6 in which said member comprises first and second legs connected by a bend having respective openings through which said shank extends, a catch formed on the end of said first leg remote from said bend, said first leg adapted to extend through said opening in the closed position of said handle to permit said catch to engage a portion of said handle at the edge of said opening, and a return bend on the end of said second leg remote from said connecting bend, said bend adapted to be received by said crosspiece.

8. A toggle latch including in combination, a handle formed with an opening, means mounting said handle for pivotal movement around a first axis between an open position and a closed position, a yoke comprising a pair of spaced legs and a crosspiece connecting said legs adjacent to first ends thereof, means mounting said legs on said handle adjacent to second ends of said legs for pivotal movement of said yoke around a second axis spaced from said first axis, and with said crosspiece adjacent to said opening in the closed position of said handle, a draw hook having a shank, means mounting said draw hook shank on said crosspiece, a secondary lock, means mounting said lock on said handle adjacent to said opening for movement in the closed position of the handle between a first position out of engagement into said crosspiece and a second position in engagement with said crosspiece and means for biasing said lock to said second position.

9. A toggle latch as in claim 8 in which said lock and said lock mounting means and said biasing means comprise a unitary member of resilient material including an operating portion extending upwardly through said opening in the closed position of said handle, a spring portion for engaging the underside of said handle adjacent said opening, a retainer portion for engaging the underside of said handle to limit the movement of said member under the action of said spring portion, a catch portion for engaging said crosspiece, and a pivot pin receiving portion.

10. A toggle latch as in claim 8 in which said lock mounting means comprises a pivot pin, a bracket carrying said pin, and means on said bracket permitting said bracket to be snapped into said opening and to be releasably retained therein.

11. A toggle latch as in claim 8 in which said lock mounting means comprises a pivot pin, a plate, means adjacent one end of said plate for supporting said plate on said handle mounting means, means adjacent the other end of said plate for engaging said handle at the edge of said opening, and means on said plate for supporting said pivot pin.

* * * * *